United States Patent
Iyer et al.

(10) Patent No.: US 11,269,391 B2
(45) Date of Patent: Mar. 8, 2022

(54) SYSTEM AND METHOD FOR SETTING A POWER STATE OF AN INFORMATION HANDLING SYSTEM

(71) Applicant: Dell Products L.P., Round Rock, TX (US)

(72) Inventors: Vivek Viswanathan Iyer, Austin, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/775,862

(22) Filed: Jan. 29, 2020

(65) Prior Publication Data

US 2021/0232197 A1 Jul. 29, 2021

(51) Int. Cl.
*G06F 1/28* (2006.01)
*G06F 9/445* (2018.01)

(52) U.S. Cl.
CPC ............ *G06F 1/28* (2013.01); *G06F 9/44505* (2013.01)

(58) Field of Classification Search
CPC ................................ G06F 1/28; G06F 9/44505
See application file for complete search history.

(56) References Cited

U.S. PATENT DOCUMENTS

| 8,782,454 | B2 * | 7/2014 | Heller | G06F 1/3206 713/323 |
| 9,086,875 | B2 * | 7/2015 | Harrat | H04W 52/0293 |
| 2008/0188187 | A1 * | 8/2008 | Armstrong | G06F 1/3287 455/73 |
| 2012/0254646 | A1 * | 10/2012 | Lin | G06F 1/3206 713/323 |
| 2012/0324259 | A1 * | 12/2012 | Aasheim | G06F 1/329 713/320 |
| 2013/0275786 | A1 * | 10/2013 | Tanaka | H04M 1/72403 713/320 |
| 2014/0047259 | A1 * | 2/2014 | Price | G06F 1/3206 713/324 |

(Continued)

*Primary Examiner* — Zahid Choudhury
(74) *Attorney, Agent, or Firm* — Baker Botts L.L.P.

(57) ABSTRACT

Setting a power state of an information handling system, including identifying a power configuration policy, the power configuration policy including configuration rules for setting the power state of the information handling system; identifying a first power state of the information handling system; identifying, at a first time period, a first proximity of a communication-enabled portable computing device with respect to the information handling system; determining that the first proximity of the communication-enabled portable computing device is greater than a threshold; determining a velocity of movement of the communication-enabled portable computing device with respect to a receiver in communication with the communication-enabled portable computing device; accessing the power configuration policy to identify a configuration rule based on the velocity of movement of the communication-enabled portable computing device; and applying the particular configuration rule to adjust the first power state of the information handling system to a second power state.

16 Claims, 4 Drawing Sheets

(56) References Cited

U.S. PATENT DOCUMENTS

| | | | |
|---|---|---|---|
| 2015/0185804 A1* | 7/2015 | Jun | G06F 1/3265 |
| | | | 713/310 |
| 2016/0041606 A1* | 2/2016 | Andrews | G06F 1/3212 |
| | | | 713/320 |
| 2016/0098339 A1* | 4/2016 | Masilamani | G06F 1/26 |
| | | | 702/186 |
| 2016/0116960 A1* | 4/2016 | Kwak | G06F 1/3206 |
| | | | 713/323 |
| 2016/0139662 A1* | 5/2016 | Dabhade | G06F 1/1686 |
| | | | 345/156 |
| 2016/0170477 A1* | 6/2016 | Flack | G06F 21/31 |
| | | | 713/323 |
| 2016/0246353 A1* | 8/2016 | Bostick | G06F 1/3231 |
| 2017/0270528 A1* | 9/2017 | Prakash | G06Q 20/4016 |
| 2018/0077442 A1* | 3/2018 | Herz | G06F 3/04883 |
| 2018/0077449 A1* | 3/2018 | Herz | H04W 4/70 |
| 2019/0066510 A1* | 2/2019 | Salter | B60Q 1/00 |

\* cited by examiner

SYSTEM AND METHOD FOR SETTING A POWER STATE OF AN INFORMATION HANDLING SYSTEM

BACKGROUND

Field of the Disclosure

The disclosure relates generally to an information handling system, and in particular, setting a power state of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her work flow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in a method for setting a power state of an information handling system, including identifying a power configuration policy, the power configuration policy including configuration rules for setting the power state of the information handling system; identifying a first power state of the information handling system; identifying, at a first time period, a first proximity of a communication-enabled portable computing device with respect to the information handling system; determining that the first proximity of the communication-enabled portable computing device is greater than a threshold; in response to determining that the first proximity of the communication-enabled portable computing device is greater than a threshold, determining, a velocity of movement of the communication-enabled portable computing device with respect to a receiver in communication with the communication-enabled portable computing device; accessing the power configuration policy to identify a particular configuration rule based on the velocity of movement of the communication-enabled portable computing device with respect to the receiver; and applying the particular configuration rule to adjust the first power state of the information handling system to a second power state Other embodiments of these aspects include corresponding systems, apparatus, and computer programs, configured to perform the actions of the methods, encoded on computer storage devices.

These and other embodiments may each optionally include one or more of the following features. For instance, identifying, at a second time period after the first time period, a second proximity of a communication-enabled portable computing device with respect to the information handling system; determining that the second proximity of the communication-enabled portable computing device is less than the threshold; in response to determining that the second proximity of the communication-enabled portable computing device is less than the threshold, determining an additional velocity of movement of the communication-enabled portable computing device with respect to the receiver; accessing the power configuration policy to identify an additional particular configuration rule based on the additional velocity of movement of the communication-enabled portable computing device with respect to the receiver; and applying the additional particular configuration rule to adjust the second power state of the information handling system to a third power state. Determining an acceleration of movement of the communication-enabled portable computing device with respect to the receiver, wherein the particular configuration rule is further based on the acceleration. The information handling system includes the receiver. The receiver is separate from the information handling system, and positioned a distance from the information handling system. The communication-enabled portable computing device is a Bluetooth-enabled portable computing device. Determining a state of charge of a battery of the information handling system, wherein the particular configuration rule is based on the state of charge of the battery. Determining one or more computational tasks currently being performed at the information handling system, wherein the particular configuration rule is based on the computational tasks currently being performed.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
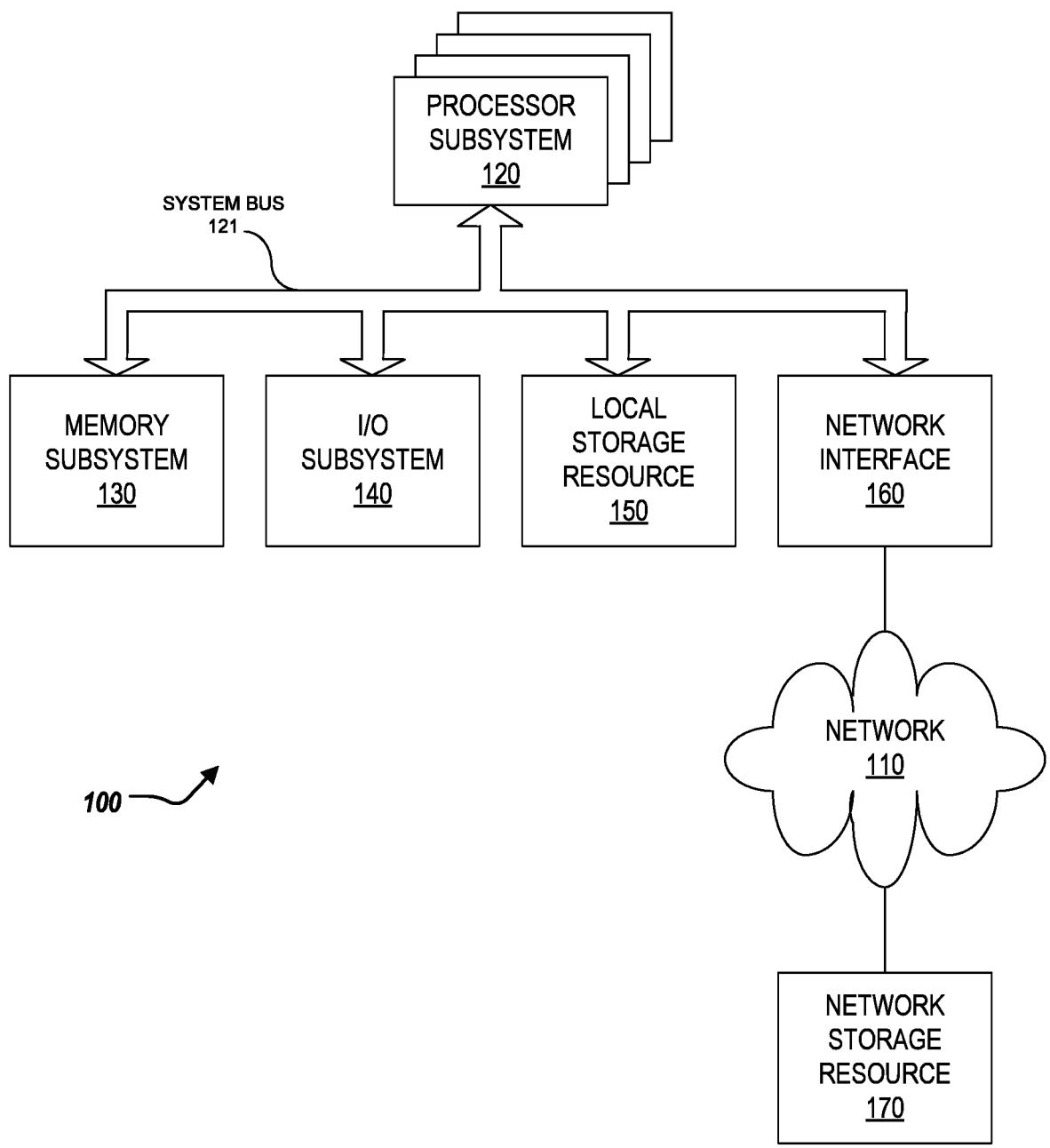
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
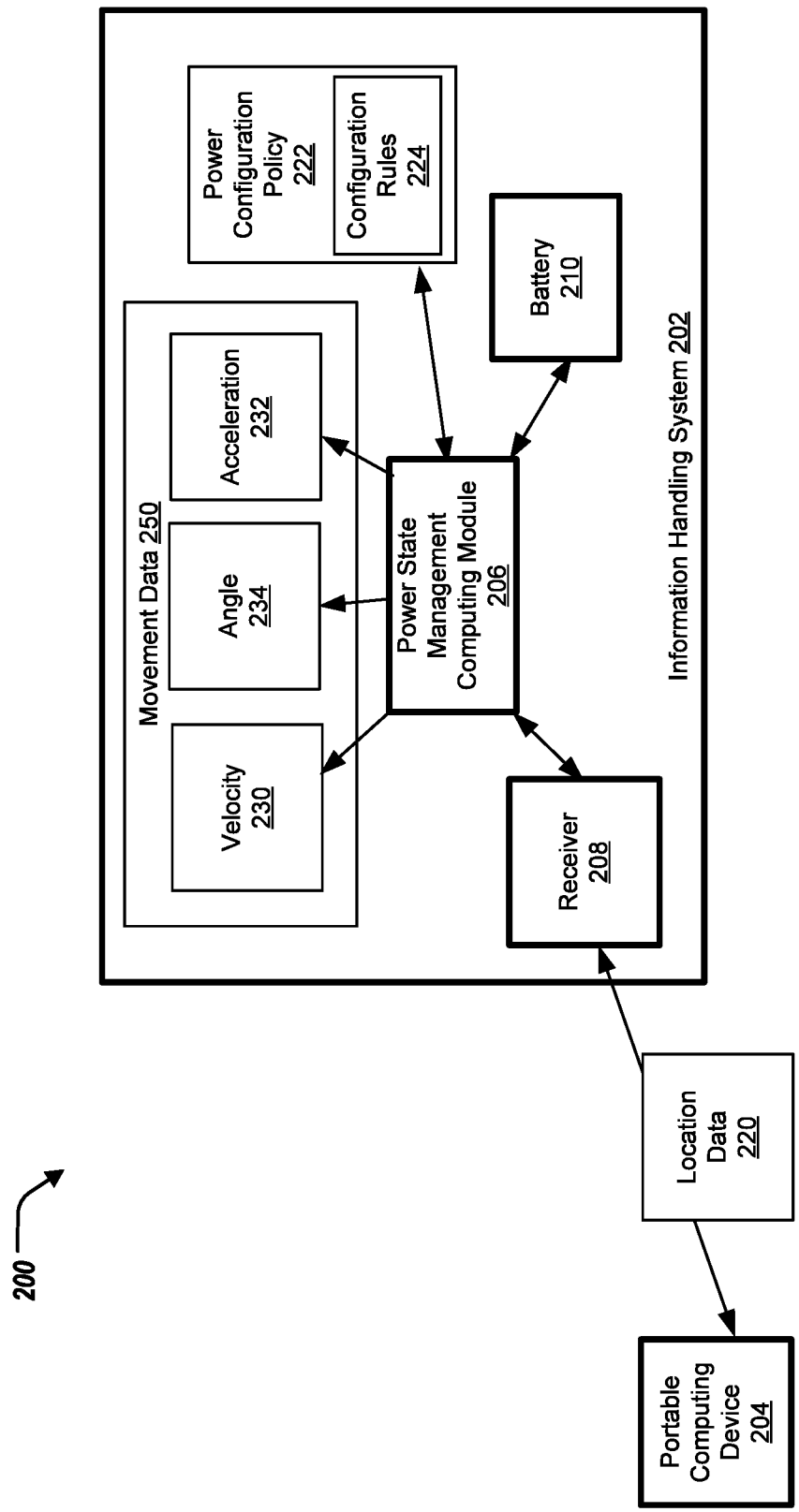
FIG. 2 illustrates a computing environment, including the information handling system including a receiver.

Turning now to FIG. 2, FIG. 2 illustrates a computing environment 200 for setting a power state of an information handling system 202. The computing environment 200 can include the information handling system 202 and a communication-enabled portable computing device 204. The information handling system 202 can be in communication with the communication-enabled portable computing device 204. The information handling system 202 can include a power state management computing module 206, a receiver 208, and a battery 210. The power state management computing module 206 can be in communication with the receiver 208 and the battery 210. The receiver 208 can be in communication with the portable computing device 204. The receiver 208 can receive location data 220 from the portable computing device 204. The location data 220 can indicate a distance between the portable computing device 204 and the receiver 208, a direction of travel of the portable computing device 204, an acceleration of the portable computing device 204, among other location data, described further herein. The power state management computing module 206 can receive the location data 220 from the receiver 208 to facilitate adjusting the power state of the information handling system 202, described further herein. In some examples, the information handling system 202 can be substantially similar to the information handling system 100 of FIG. 1.

In short, the power state management computing module 206 can optimize responsiveness of the information handling system 200 and power consumption of the information handling system 200 based on location data 220 of the portable computing device 204 to manage tradeoffs between performance/responsiveness and power of the information handling system 200.

In some implementations, the power state management computing module 206 can identify a power configuration policy 222. The power configuration policy 222 can include configuration rules 224 for setting the power state of the information handling system 202. Specifically, the configuration rules 224 can indicate for a parameter (or parameters) of the portable computing device 204 and/or the information handling system 202, a corresponding responsiveness value (e.g., a value 1-10). In some examples, the responsiveness value can be based on a power state value. For example, the power state values can be modern standby (MS) power states (e.g., modern standby power state 1-modern standby power state 9). Specifically, MS power state 1 is resiliency mode; MS power state 2 is resiliency notification; MS power state 3 is low-power phase; MS power state 4 is desktop activity moderator; MS power state 5 is maintenance; MS power state 6 is process lifetime manager; MS power state 7 is presence phase; MS power state 8 is connection phase; and MS power state 9 is a normal power state ("no MS power state"). The lower the MS power state number, the lower system power provided by the battery 210.

In some examples, the responsiveness value can indicate one or more power-based computing actions that are executed by the information handling system 202. For example, a responsiveness value of 1, the configuration rules 224 can indicate to i) throttle system power to minimum, enable contextual fast charge in AC; and ii) maintain information handling system 202 in MS power state 1. For a responsiveness value of 7, the configuration rules 224 can indicate to i) throttle system power (to a lesser degree as compared to responsiveness value of 1); ii) adjust the MS power state of the information handling system 202 to MS power state 7; iii) set dynamic platform and thermal framework (DPTF) to predatively cool information handling/ system 202 for sustained workload; and iv) preload limited and high priority context (e.g., applications, files, etc.) relevant to upcoming activities. For a responsiveness value of 10, the configuration rules 224 can indicate to i) disable contextual Bayesian analysis tool for modeling and uncertainty quantification (BATMAN) ii) adjust the MS power state of the information handling system 202 to MS power state 9; iii) preload all context (e.g., applications, files, etc.) relevant to upcoming activities.

In some examples, the parameters of the portable computing device 204 can include a velocity of movement of the portable computing device 204 with respect to the information handling system 202 and/or the receiver 208; an acceleration of movement of the portable computing device 204 with respect to the information handling system 202 and/or the receiver 208; and an angle (or direction) of movement of the portable computing device 204 with respect to the information handling system 202 and/or the receiver 208.

In some implementations, the power state management computing module 206 can identify a first power state of the information handling system 202. That is, the information handling system 202 can be in a first power state, e.g., operating at a first power state. The power state management computing module 206 can identify, at a first time period, a first proximity of the portable computing device 204 with respect to the information handling system 202. Specifically, the portable computing device 204 can provide the location data 220 to the receiver 208. The location data 220 can include such data as a distance between the portable computing device 204 and the receiver 208 at one or more times of the first time period, a direction of travel of the portable computing device 204 with respect to the receiver 208, an acceleration of the portable computing device 204 as the portable computing device 204, among other location data.

The portable computing device 204 can be in communication with the receiver 208 to provide the location data 220 to the receiver 208. The portable computing device 204 can provide the location data 220 automatically (e.g., at predetermined time intervals), or in response to a request (e.g., by the power state management computing module 206). In some examples, the portable computing device 204 is Bluetooth-enabled such that the portable computing device 204 communicates with the receiver 208 utilizing the Bluetooth communication standard/protocol (e.g., Bluetooth 5.2). The receiver 208 can provide the location data 220 (or a subset of the location data 220) to the power state management computing module 206.

In some examples, the portable computing device 204 can leave a proximity of the receiver 208. For example, the portable computing device 204 can be a smart pen, a smart mouse, or other portable computing device that is able to be transported (e.g., by a user), and is communicatively linked with the receiver 208, and provides location data 220 regarding one or more location-based parameters of the portable computing device 204 with respect to the receiver 208 and/or the information handling system 202. When a distance between the portable computing device 204 and the receiver 208 is greater than a threshold distance, the portable computing device 204 is considered to be leaving the proximity of the receiver 208, and the power state management computing module 206 adjusts the power state of the information handling system 200 appropriately (e.g., lower the MS power state), described further herein.

In some implementations, the power state management computing module 206 can determine that a proximity of the portable computing device 204 is greater than a threshold distance. Specifically, the power state management computing module 206 can compare a distance between the portable computing device 204 and the information handling system 202 based on the location data 220. That is, the location data 220 can include the distance between the information handling system 202 and the portable computing device 204. For example, the distance can be based on a time between communication of the location data 220 (e.g., over Bluetooth, Bluetooth 5.2) between the portable computing device 204 and the receiver 208. The power state management computing module 206 can compare the distance between the information handling system 202 and the portable computing device 204 to a threshold distance. The threshold distance can be based on user preferences, computational abilities of the information handling system 202, and/or the portable computing device 204.

In some implementations, the power state management computing module 206 determines movement data 250 of the portable computing device 204 with respect to the receiver 208. Specifically, the power state management computing module 206 determines the movement data 250 in response to determining that the proximity of the portable computing device 204 is greater than the threshold distance. For example, the movement data 250 can include a velocity 230 of movement of the portable computing device 204 with respect to the receiver 208; an acceleration 232 of movement of the portable computing device 204 with respect to the receiver 208; and an angle 234 of movement (or direction) of the portable computing device 204 with respect to the receiver 208.

In some examples, the power state management computing module 206 determines the velocity 230 of movement of the portable computing device 204 with respect to the receiver 208. Specifically, the power state management computing module 206 determines the velocity 230 in response to determining that the proximity of the portable computing device 204 is greater than the threshold distance. For example, the power state management computing module 206 can determine the velocity 230 of the movement of the portable computing device 204 based on the location data 220. For example, the location data 220 can provide distance-based information and timing-based information of the portable computing device 204 with respect to the receiver 208. Specifically, over the first time period, the portable computing device 204 can communicate the location data 220 multiple times (e.g., multiple distances and times) such that the power state management computing module 206 can determine the velocity 230 of movement of the portable computing device 204 as the portable computing device 204 increases the distance between the portable computing device 204 and the receiver 208 (e.g., leaves the proximity of the receiver 208).

In some examples, the power state management computing module 206 determines the acceleration 232 of movement of the portable computing device 204 with respect to the receiver 208. Specifically, the power state management computing module 206 determines the acceleration 232 in response to determining that the proximity of the portable computing device 204 is greater than the threshold distance. For example, the power state management computing module 206 can determine the acceleration 232 of the movement of the portable computing device 204 based on the location data 220. For example, the location data 220 can provide distance-based information and timing-based information of the portable computing device 204 with respect to the receiver 208. Specifically, over the first time period, the portable computing device 204 can communicate the location data 220 multiple times (e.g., multiple distances and times) such that the power state management computing module 206 can determine the acceleration 232 of movement of the portable computing device 204 as the portable computing device 204 increases the distance between the portable computing device 204 and the receiver 208 (e.g., leaves the proximity of the receiver 208).

In some examples, the power state management computing module 206 determines the angle 234 of movement (or direction) of the portable computing device 204 with respect to the receiver 208. Specifically, the power state management computing module 206 determines the angle 234 of movement (or direction) of the portable computing device 204 with respect to the receiver 208 in response to determining that the proximity of the portable computing device 204 is greater than the threshold distance. For example, the power state management computing module 206 can determine the angle 324 (or direction) of the movement of the portable computing device 204 based on the location data 220. For example, the location data 220 can provide distance-based information and timing-based information of the portable computing device 204 with respect to the receiver 208. Specifically, over the first time period, the portable computing device 204 can communicate the location data 220 multiple times (e.g., multiple distances and times) such that the power state management computing module 206 can determine the angle 232 of movement of the portable computing device 204 as the portable computing device 204 increases the distance between the portable computing device 204 and the receiver 208 (e.g., leaves the proximity of the receiver 208).

In some implementations, the power state management computing module 206 accesses the power configuration policy 222 to identify a particular configuration rule 224 based on the movement data 250 of the portable computing device 204 with respect to the receiver 208. In other words, the power state management computing module 206 accesses the power configuration policy 222 to identify a particular configuration rule 224 based on one or more of the velocity 230, the acceleration 232, and the angle 234 of the portable computing device 204 with respect to the receiver 208. Specifically, the power state management computing module 206 can compare one or more of the velocity 230, the acceleration 232, and the angle 234 with the power configuration policy 222 to identify the particular configuration rule 224 that corresponds to the movement data 250. As mentioned previously, the configuration rule 224 can identify a responsiveness value that can include a power state or power state value. That is, the particular configuration rule 224 can indicate a responsiveness value that corresponds to one or more power-based computing actions that are executed by the information handling system 202 to adjust the power state of the information handling system 202 to a second power state. In some examples, the responsive values of the configuration rules 224 are based on a first derivative of the distance between the portable computing device 204 and the receiver 208. To that end, the power state management computing module 206 identifies a responsiveness value that corresponds to power-based computing actions that are executed by the information handling system 202 based on the movement data 250 (e.g., the velocity 230, the acceleration 232, and/or the angle 234).

In some implementations, the power state management computing module 206 applies the particular configuration rule 224 to adjust the first power state of the information handling system 202 to the second power state. That is, the power state management computing module 206 applies the power-based computing actions associated with the particular configuration rule 224 to adjust the first power state of the information handling system 202 to the second power state. For example, the power state management computing module 206 can adjust the power state of the information handling system 202 to a lower power state, e.g., to modern standby state that is lower than the modern standby state associated with the first power state.

In some examples, the portable computing device 208 can approach the receiver 208. Specifically, when a distance between the portable computing device 204 and the receiver 208 is less than a threshold distance, the portable computing device 204 is considered to be approaching the proximity of the receiver 208, and the power state management computing module 206 adjusts the power state of the information handling system 200 appropriately (e.g., increase the MS power state), described further herein.

Specifically, the power state management computing module 206 can determine that a second proximity of the portable computing device 204 is less than the threshold distance. Specifically, the power state management computing module 206 can compare a distance between the portable computing device 204 and the information handling system 202 based on the location data 220. That is, the location data 220 can include the distance between the information handling system 202 and the portable computing device 204.

In some implementations, the power state management computing module 206 determines movement data 250 of the portable computing device 204 with respect to the receiver 208. Specifically, the power state management computing module 206 determines the movement data 250 in response to determining that the proximity of the portable computing device 204 is less than the threshold distance.

In some examples, the power state management computing module 206 determines the velocity 230 of movement of the portable computing device 204 with respect to the receiver 208. Specifically, the power state management computing module 206 determines the velocity 230 in response to determining that the proximity of the portable computing device 204 is less than the threshold distance. For example, the power state management computing module 206 can determine the velocity 230 of the movement of the portable computing device 204 based on the location data 220. For example, the location data 220 can provide distance-based information and timing-based information of the portable computing device 204 with respect to the receiver 208. Specifically, over the second time period, the portable computing device 204 can communicate the location data 220 multiple times (e.g., multiple distances and times) such that the power state management computing module 206 can determine the velocity 230 of movement of the portable computing device 204 as the portable computing device 204 decreases the distance between the portable computing device 204 and the receiver 208 (e.g., approaches the proximity of the receiver 208).

In some examples, the power state management computing module 206 determines the acceleration 232 of movement of the portable computing device 204 with respect to the receiver 208. Specifically, the power state management computing module 206 determines the acceleration 232 in response to determining that the proximity of the portable computing device 204 is less than the threshold distance. For example, the power state management computing module 206 can determine the acceleration 232 of the movement of the portable computing device 204 based on the location data 220. For example, the location data 220 can provide distance-based information and timing-based information of the portable computing device 204 with respect to the receiver 208. Specifically, over the second time period, the portable computing device 204 can communicate the location data 220 multiple times (e.g., multiple distances and times) such that the power state management computing module 206 can determine the acceleration 232 of movement of the portable computing device 204 as the portable computing device 204 decreases the distance between the portable computing device 204 and the receiver 208 (e.g., approaches the proximity of the receiver 208).

In some examples, the power state management computing module 206 determines the angle 234 of movement (or direction) of the portable computing device 204 with respect to the receiver 208. Specifically, the power state management computing module 206 determines the angle 234 of movement (or direction) of the portable computing device 204 with respect to the receiver 208 in response to determining that the proximity of the portable computing device 204 is less than the threshold distance. For example, the power state management computing module 206 can determine the angle 324 (or direction) of the movement of the portable computing device 204 based on the location data 220. For example, the location data 220 can provide distance-based information and timing-based information of the portable computing device 204 with respect to the receiver 208. Specifically, over the second time period, the portable computing device 204 can communicate the location data 220 multiple times (e.g., multiple distances and times) such that the power state management computing module 206 can determine the angle 232 of movement of the portable computing device 204 as the portable computing device 204 decreases the distance between the portable computing device 204 and the receiver 208 (e.g., approaches the proximity of the receiver 208).

In some implementations, the power state management computing module 206 accesses the power configuration policy 222 to identify a particular configuration rule 224 based on the movement data 250 of the portable computing device 204 with respect to the receiver 208. In other words, the power state management computing module 206 accesses the power configuration policy 222 to identify a particular configuration rule 224 based on one or more of the velocity 230, the acceleration 232, and the angle 234 of the portable computing device 204 with respect to the receiver 208. Specifically, the power state management computing module 206 can compare one or more of the velocity 230, the acceleration 232, and the angle 234 with the power configuration policy 222 to identify the particular configuration rule 224 that corresponds to the movement data 250. As mentioned previously, the configuration rule 224 can identify a responsiveness value that can include a power state or power state value. That is, the particular configuration rule 224 can indicate a responsiveness value that corresponds to one or more power-based computing actions that are executed by the information handling system 202 to adjust the power state of the information handling system 202 to a third power state. In some examples, the responsive values of the configuration rules 224 are based on a first derivative of the distance between the portable computing device 204 and the receiver 208. To that end, the power state management computing module 206 identifies a responsiveness value that corresponds to power-based computing actions that are executed by the information handling system 202 based on the movement data 250 (e.g., the velocity 230, the acceleration 232, and/or the angle 234).

In some implementations, the power state management computing module 206 applies the particular configuration rule 224 to adjust the second power state of the information handling system 202 to the third power state. That is, the power state management computing module 206 applies the power-based computing actions associated with the particular configuration rule 224 to adjust the second power state of the information handling system 202 to the third power state. For example, the power state management computing module 206 can adjust the power state of the information handling system 202 to a higher power state, e.g., to modern standby state that is higher than the modern standby state associated with the second power state.

Figure 3:
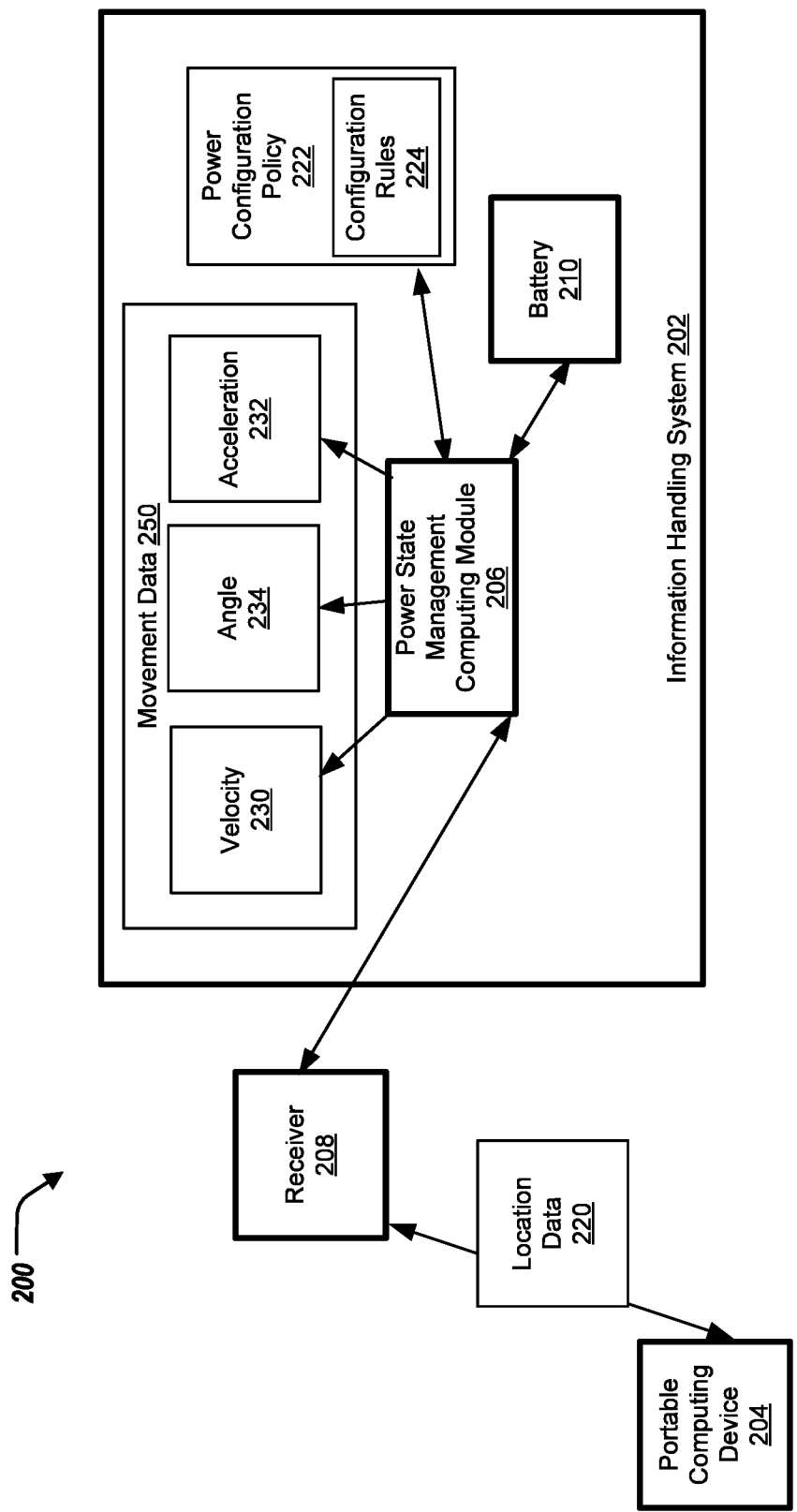
FIG. 3 illustrates a computing environment, including the receiver outside of the information handling system.

FIG. 3 illustrates the computing environment 200 including the receiver 208 separate from the information handling system 202. Specifically, the receiver 208 is positioned a distance from the information handling system 202. For example, the receiver 208 can be a beacon, or other distinct device that can be positioned separate from the information handling system 202.

In some examples, the power state management computing module 206 can determine a state of charge of the battery 210. For example, the state of charge of the battery 210 can include a quantity of milli-amperes (mAH) of the battery 210. To that end, the power configuration policy 222, and more specifically, the configuration rules 224 can further be based on the state of charge of the battery 210. Specifically, the configuration rules 224 can indicate for the movement data 250 and/or the state of charge of the battery 210, the corresponding responsiveness value. To that end, the power state management computing module 206 can access the power configuration policy 222 to identify a particular configuration rule 224 based on the movement data 250 of the portable computing device 204 with respect to the receiver 208 and the state of charge of the battery 210 and apply the particular configuration rule 224 to adjust the first power state of the information handling system 202 to the second power state.

In some examples, the power state management computing module 206 can determine one or more computational tasks currently being performed at the information handling system 202. For example, the computational tasks can include a processing power utilized by the information handling system 202. To that end, the power configuration policy 222, and more specifically, the configuration rules 224 can further be based on the computational tasks currently being performed at the information handling system 202. Specifically, the configuration rules 224 can indicate for the movement data 250 and/or the computational tasks currently being performed at the information handling system 202, the corresponding responsiveness value. To that end, the power state management computing module 206 can access the power configuration policy 222 to identify a particular configuration rule 224 based on the movement data 250 of the portable computing device 204 with respect to the receiver 208 and the computational tasks currently being performed at the information handling system 202 and apply the particular configuration rule 224 to adjust the first power state of the information handling system 202 to the second power state.

Figure 4:
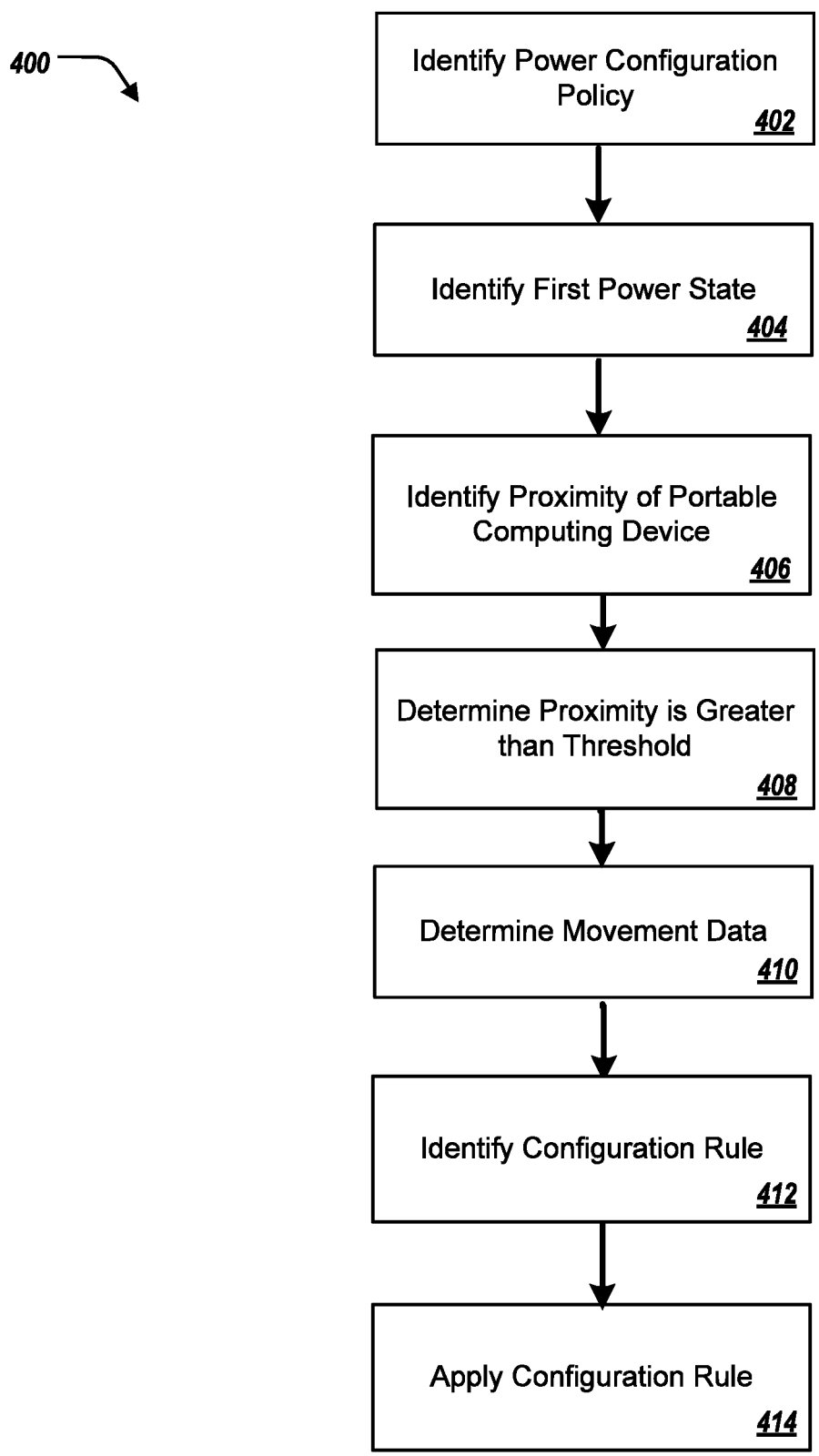
FIG. 4 illustrates a method for setting a power state of the information handling system.

FIG. 4 illustrates a flowchart depicting selected elements of an embodiment of a method 400 for setting a power state of the information handling system 202. The method 400 may be performed by the information handling system 100, the computing environment 200, the information handling system 202, and/or the power state management computing module 206, and with reference to FIGS. 1-3. It is noted that certain operations described in method 400 may be optional or may be rearranged in different embodiments.

The power state management computing module 206 can identify a power configuration policy 222 (402). The power configuration policy 222 can include configuration rules 224 for setting the power state of the information handling system 202. The power state management computing module 206 can identify a first power state of the information handling system 202 (404). The power state management computing module 206 can identify, at a first time period, a first proximity of the portable computing device 204 with respect to the information handling system 202 (406). The power state management computing module 206 can determine that a proximity of the portable computing device 204 is greater than a threshold distance (408). The power state management computing module 206 determines movement data 250 of the portable computing device 204 with respect to the receiver 208 in response to determining that the proximity of the portable computing device 204 is greater than the threshold distance (410). The power state management computing module 206 accesses the power configuration policy 222 to identify a particular configuration rule 224 based on the movement data 250 of the portable computing device 204 with respect to the receiver 208 (412). The power state management computing module 206 applies the particular configuration rule 224 to adjust the first power state of the information handling system 202 to the second power state (414).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for setting a power state of an information handling system, comprising:
    identifying a power configuration policy, the power configuration policy including configuration rules for setting the power state of the information handling system;
    identifying a first power state of the information handling system;
    identifying, at a first time period, a first proximity of a communication-enabled portable computing device with respect to the information handling system;
    calculating a distance threshold associated with the information handling system based on i) computational abilities of the information handling system and ii) computational abilities of the portable computing device;
    determining that the first proximity of the communication-enabled portable computing device is greater than the distance threshold;
    in response to determining that the first proximity of the communication-enabled portable computing device is greater than the distance threshold:
        i) determining a velocity of movement of the communication-enabled portable computing device with respect to a receiver in communication with the communication-enabled portable computing device;
        ii) determining an acceleration of movement of the communication-enabled portable computing device with respect to the receiver;
        iii) determining an angle of movement of the communication-enabled portable computing device with respect to the receiver; and
        iv) determining a state of charge (SOC) of a battery of the information handling system;
    accessing the power configuration policy to identify a particular configuration rule based on the velocity of movement, the acceleration of movement, the angle of movement of the communication-enabled portable computing device with respect to the receiver, and the SOC of the battery of the information handling system; and
    applying the particular configuration rule to adjust the first power state of the information handling system to a second power state.

2. The computer-implemented method of claim 1, further comprising:
    identifying, at a second time period after the first time period, a second proximity of a communication-enabled portable computing device with respect to the information handling system;
    determining that the second proximity of the communication-enabled portable computing device is less than the distance threshold;
    in response to determining that the second proximity of the communication-enabled portable computing device is less than the distance threshold, determining an additional velocity of movement of the communication-enabled portable computing device with respect to the receiver;
    accessing the power configuration policy to identify an additional particular configuration rule based on the additional velocity of movement of the communication-enabled portable computing device with respect to the receiver; and
    applying the additional particular configuration rule to adjust the second power state of the information handling system to a third power state.

3. The computer-implemented method of claim 1, wherein the information handling system includes the receiver.

4. The computer-implemented method of claim 1, wherein the receiver is separate from the information handling system, and positioned a distance from the information handling system.

5. The computer-implemented method of claim 1, wherein the communication-enabled portable computing device is a Bluetooth-enabled portable computing device.

6. The computer-implemented method of claim 1, further comprising:

determining one or more computational tasks currently being performed at the information handling system, wherein the particular configuration rule is based on the computational tasks currently being performed.

7. An information handling system, comprising:
a memory media storing instructions;
a processor in communication with the memory media to execute the instructions to perform operations comprising:
- identifying a power configuration policy, the power configuration policy including configuration rules for setting the power state of the information handling system;
- identifying a first power state of the information handling system;
- identifying, at a first time period, a first proximity of a communication-enabled portable computing device with respect to the information handling system;
- calculating a distance threshold associated with the information handling system based on i) computational abilities of the information handling system and ii) computational abilities of the portable computing device;
- determining that the first proximity of the communication-enabled portable computing device is greater than the distance threshold;
- in response to determining that the first proximity of the communication-enabled portable computing device is greater than the distance threshold:
  - i) determining a velocity of movement of the communication-enabled portable computing device with respect to a receiver in communication with the communication-enabled portable computing device;
  - ii) determining an acceleration of movement of the communication-enabled portable computing device with respect to the receiver;
  - iii) determining an angle of movement of the communication-enabled portable computing device with respect to the receiver; and
  - iv) determining a state of charge (SOC) of a battery of the information handling system;
- accessing the power configuration policy to identify a particular configuration rule based on the velocity of movement, the acceleration of movement, and the angle of movement of the communication-enabled portable computing device with respect to the receiver, and the SOC of the battery of the information handling system; and
- applying the particular configuration rule to adjust the first power state of the information handling system to a second power state.

8. The information handling system of claim 7, the operations further comprising:
- identifying, at a second time period after the first time period, a second proximity of a communication-enabled portable computing device with respect to the information handling system;
- determining that the second proximity of the communication-enabled portable computing device is less than the distance threshold;
- in response to determining that the second proximity of the communication-enabled portable computing device is less than the distance threshold, determining an additional velocity of movement of the communication-enabled portable computing device with respect to the receiver;
- accessing the power configuration policy to identify an additional particular configuration rule based on the additional velocity of movement of the communication-enabled portable computing device with respect to the receiver; and
- applying the additional particular configuration rule to adjust the second power state of the information handling system to a third power state.

9. The information handling system of claim 7, wherein the information handling system includes the receiver.

10. The information handling system of claim 7, wherein the receiver is separate from the information handling system, and positioned a distance from the information handling system.

11. The information handling system of claim 7, wherein the communication-enabled portable computing device is a Bluetooth-enabled portable computing device.

12. The information handling system of claim 7, the operations further comprising:
determining one or more computational tasks currently being performed at the information handling system, wherein the particular configuration rule is based on the computational tasks currently being performed.

13. A non-transitory computer-readable medium storing software comprising instructions executable by one or more computers which, upon such execution, cause the one or more computers to perform operations comprising:
- identifying a power configuration policy, the power configuration policy including configuration rules for setting the power state of the information handling system;
- identifying a first power state of the information handling system;
- identifying, at a first time period, a first proximity of a communication-enabled portable computing device with respect to the information handling system;
- calculating a distance threshold associated with the information handling system based on i) computational abilities of the information handling system and ii) computational abilities of the portable computing device;
- determining that the first proximity of the communication-enabled portable computing device is greater than the distance threshold;
- in response to determining that the first proximity of the communication-enabled portable computing device is greater than the distance threshold:
  - i) determining a velocity of movement of the communication-enabled portable computing device with respect to a receiver in communication with the communication-enabled portable computing device;
  - ii) determining an acceleration of movement of the communication-enabled portable computing device with respect to the receiver;
  - iii) determining an angle of movement of the communication-enabled portable computing device with respect to the receiver; and
  - iv) determining a state of charge (SOC) of a battery of the information handling system;
- accessing the power configuration policy to identify a particular configuration rule based on the velocity of movement, the acceleration of movement, and the angle of movement of the communication-enabled portable computing device with respect to the receiver, and the SOC of the battery of the information handling system; and applying the particular configuration rule to adjust the first power state of the information handling system to a second power state.

14. The computer-readable medium of claim 13, the operations further comprising:
   identifying, at a second time period after the first time period, a second proximity of a communication-enabled portable computing device with respect to the information handling system;
   determining that the second proximity of the communication-enabled portable computing device is less than the distance threshold;
   in response to determining that the second proximity of the communication-enabled portable computing device is less than the distance threshold, determining an additional velocity of movement of the communication-enabled portable computing device with respect to the receiver;
   accessing the power configuration policy to identify an additional particular configuration rule based on the additional velocity of movement of the communication-enabled portable computing device with respect to the receiver; and
   applying the additional particular configuration rule to adjust the second power state of the information handling system to a third power state.

15. The computer-readable medium of claim 13, the operations further comprising:
   determining an acceleration of movement of the communication-enabled portable computing device with respect to the receiver, wherein the particular configuration rule is further based on the acceleration.

16. The computer-readable medium of claim 13, wherein the information handling system includes the receiver.

* * * * *